Figure 1:
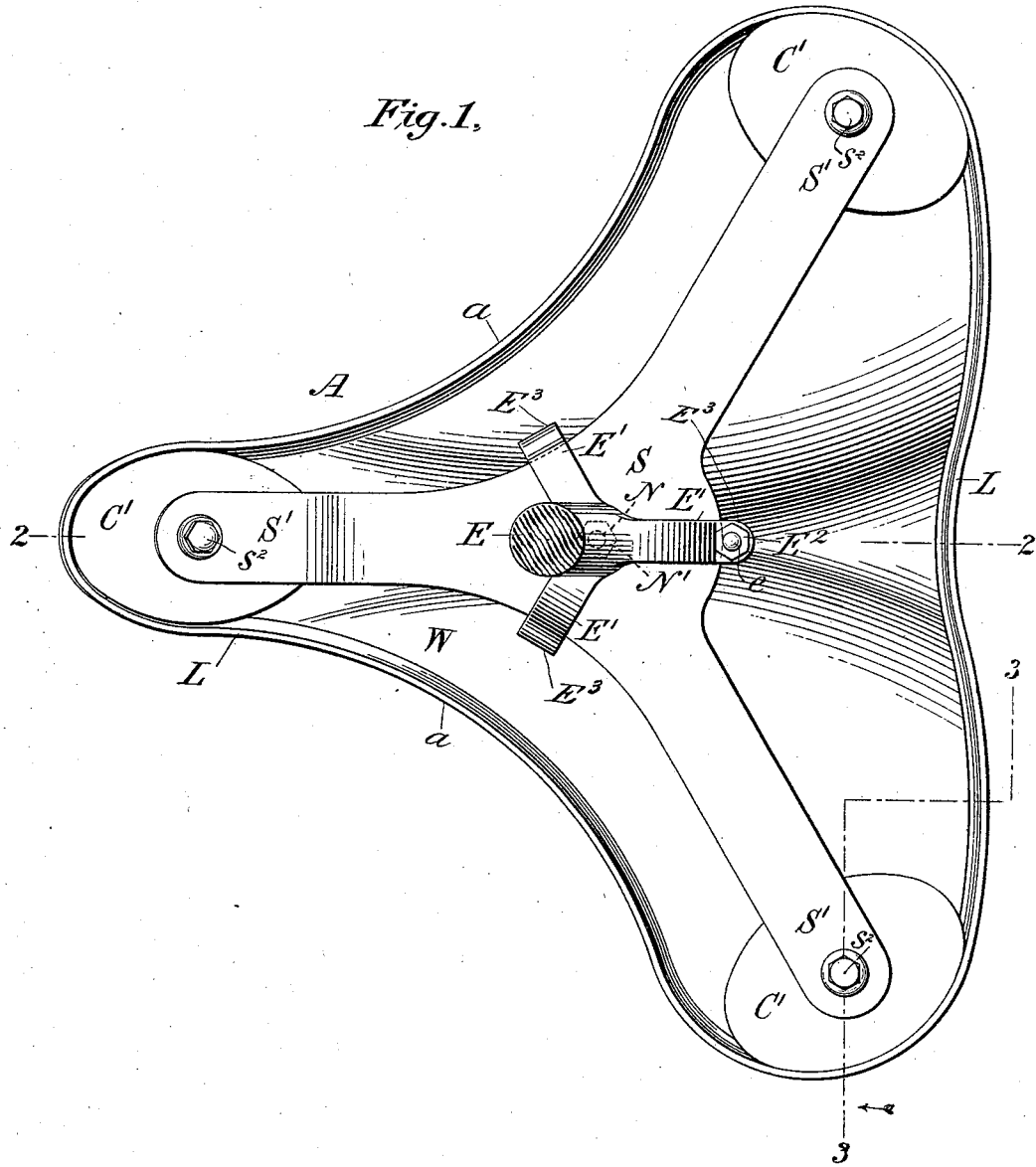

(No Model.)

2 Sheets—Sheet 1.

C. M. RICHMOND.
SEAT FOR BICYCLES.

No. 595,680.

Patented Dec. 14, 1897.

WITNESSES:
C. E. Ashley
Leon C Richmond

INVENTOR:
Casimo M Richmond (No Model.) 2 Sheets—Sheet 2.
C. M. RICHMOND.
SEAT FOR BICYCLES.
No. 595,680. Patented Dec. 14, 1897.
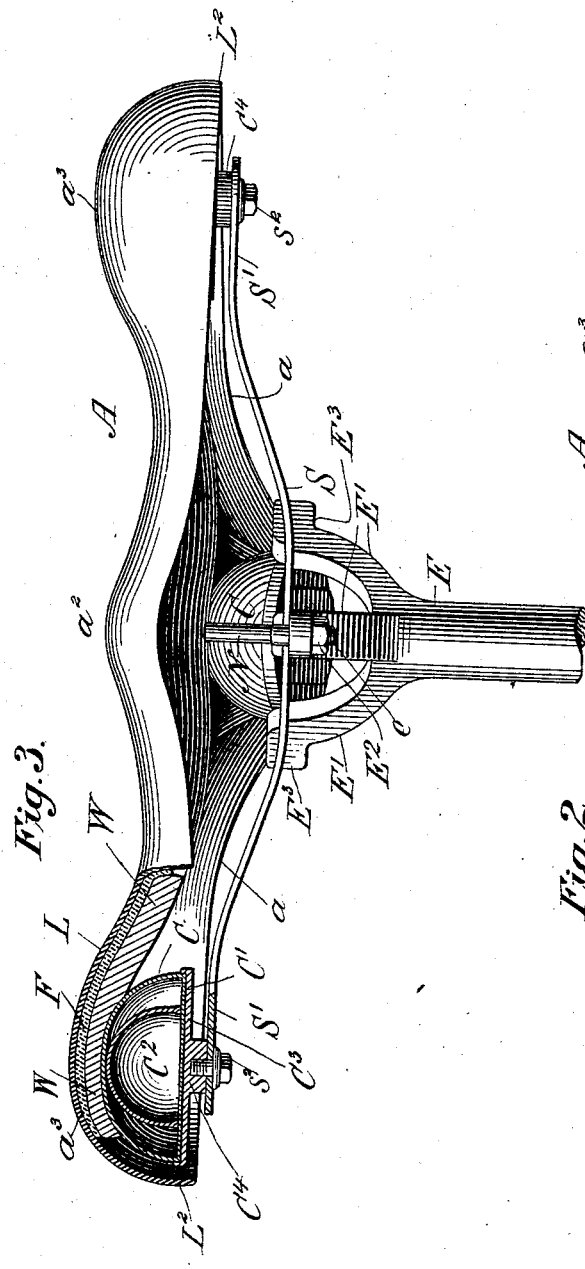
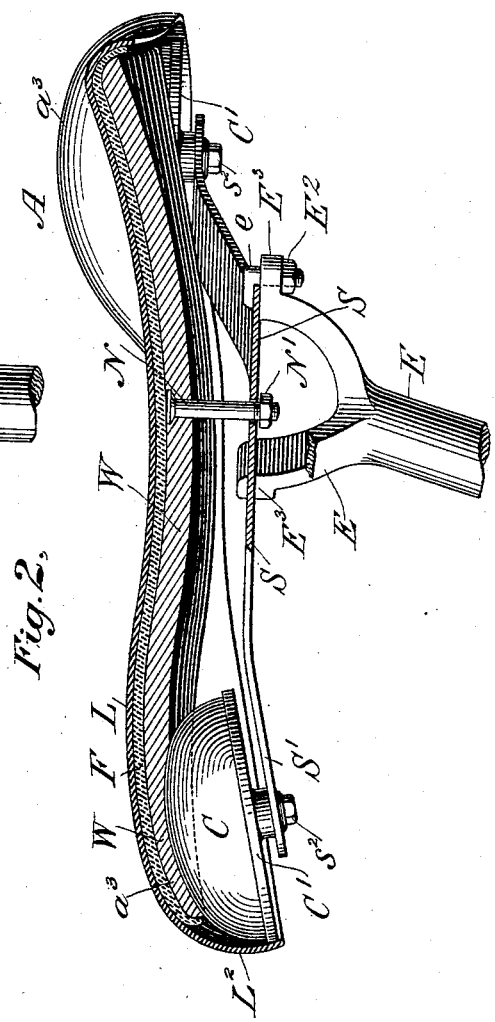

UNITED STATES PATENT OFFICE.

CASSIUS M. RICHMOND, OF NEW YORK, N. Y., ASSIGNOR TO THE UNIVERSAL TRADING COMPANY, OF SAME PLACE.

SEAT FOR BICYCLES.

SPECIFICATION forming part of Letters Patent No. 595,680, dated December 14, 1897.

Application filed May 23, 1896. Serial No. 592,888. (No model.)

*To all whom it may concern:*

Be it known that I, CASSIUS M. RICHMOND, a citizen of the United States, residing at New York, in the county of New York and State of New York, have invented certain new and useful Improvements in Seats or Saddles for Bicycles and Similar Vehicles, of which the following is a specification, reference being had to the accompanying drawings, forming a part thereof, in which similar letters of reference designate like or equivalent parts wherever found throughout the several views.

The object of this invention is to provide an air-cushioned seat or saddle for bicycles and other vehicles of this class which is simple in construction and operation and which is also strong and durable and not liable to get out of order in the operation of the vehicle, a further object being to provide a seat or saddle of this class the seat proper of which is composed of wood or similar material and which is supported by air pads or cushions which are supported by a spring-frame which is detachably connected with a suitable crosshead or tripod which is adapted to be connected with the frame of the vehicle, in the usual manner.

The invention is fully disclosed in the following specification, of which the accompanying drawings form a part, in which—

Figure 1 is a bottom plan view of my improved seat for bicycles and similar vehicles, the support thereof being shown in cross-section; Fig. 2, a section on the line 2 2 of Fig. 1, and Fig. 3 a section on the line 3 3.

In the practice of my invention I provide a bicycle seat or saddle the seat proper of which, which is designated by the reference-letter A, is preferably of the usual form, said form being somewhat triangular or being provided with an enlarged transverse rear portion and a centrally-elongated front portion, the sides of the elongated front portion being inwardly curved, as shown at $a$ in Fig. 1, and the seat A is composed of a bottom or base portion W, which is preferably composed of wood, but which may be composed of any desired material, and said body or base portion is so formed as to conform to the shape of the inferior portions of the body, the central longitudinal portion thereof being upwardly curved, as shown at $a^2$ in Fig. 3, and each of the corners or extensions being also convex on their upper surfaces and concave on their lower surfaces, as shown at $a^3$, and the body or base portion of the seat is preferably provided with a cover or cushion of felt or similar material, as shown at F, and over this is placed a covering L, of leather, and said covering of leather is preferably continued downwardly and around the body portion of wood, as clearly shown in Figs. 1 and 2.

I also provide the usual seat-support E, which is adapted to be connected with the central upright rod of the frame of a bicycle or similar vehicle in the usual manner, and this support E consists of a rod having a crosshead or tripod comprising a plurality of outwardly and upwardly curved arms E', which are preferably three in number, and each of the arms E' is provided at its upper end with shoulders or heads $E^3$, and I also provide a spring-support proper for the seat which is made of sheet metal and substantially triangular in form and which comprises a central portion S, which is provided with three arms or extensions S', and two of the shoulders or heads $E^3$ of the arms E' are provided with slots which open inwardly and into which the central or body portion S of the spring seat-support is placed, and the other is provided with a bolt $e$, having a cross-head, as shown in Fig. 2, which overlaps the side of the central body portion S of the spring seat-support and which passes through the other shoulder or head $E^3$ and is securely held in place by a nut $E^2$.

The arms or projections S" of the spring seat-support extend outwardly in the direction of the corners of the seat, and I also provide at each corner of the seat an air cushion or pad on which the corners of the seat rest, and said cushion or pad consists of an outer hollow semispherical cushion C, composed of soft rubber, soft rubber and canvas, or similar material, which is hermetically sealed to a flat base portion C', which is also composed of soft rubber, soft rubber and canvas, or similar material, and within the outer semispherical hollow cushion or pad C is placed a reinforcing cushion or pad $C^2$, which is composed of similar material and which is also hermetically sealed to the flat or base portion C', and the cushions C and $C^2$ are each filled with air under normal pressure, and the base or bottom portion C' is secured to a rigid base-plate C³, which is circular in form and which is provided centrally thereof and on its lower side with a shoulder or head C⁴, into which passes a screw or bolt S², by which the cushions or pads are secured to the arms S' of the spring seat-support.

Passing centrally through the body or base portion W of the seat is a bolt N, which also passes through the central or body portion of the spring seat-support and which is provided on its lower end with a nut N', and the bolt N is rigidly secured in the body portion W of the seat, but is free to move through the central or body portion S of the spring seat-support.

The air cushions or pads, one of which is placed at each corner of the seat, are preferably composed of strong white or light-colored rubber, such as is usually employed in making syringes and similar articles, and the inner or reinforcing cushion or pad C² is designed to serve as a support for the outer cushion or pad, and the said pad as a whole is plano-convex is form, the bottom portion being flat and the upper portion being substantially semispherical. This shape, however, may be varied slightly without departing from the spirit of my invention, and I reserve the right to make such changes and alterations in the air cushions or pads by which the seat is directly supported as fairly come within the scope of the invention. It will also be seen that the air cushions or pads are also spring-supported, the spring-support comprising the body portion S and the arms S', which are formed integrally therewith, being composed of spring-steel or similar material, and it will thus be seen that my improved seat is connected with the support E by spring-arms, and that said seat proper is supported on said spring-arms by air cushions or pads which are connected therewith, and that the only direct connection between the body portion of the seat and the spring seat-support with which the air cushions or pads are connected is by means of the bolt or rod N, which is free to move through the body portion of the spring seat-support.

When the parts C and C² of the air cushions or pads are hermetically sealed to the flat base portion C', the air therein, which is under normal atmospheric pressure, will remain therein under all circumstances and conditions, and these pads or cushions, if protected from water or moisture, will last as long as the bicycle. It will be understood, however, that new ones may be substituted therefor at any time, if such substitution should become necessary, and it is evident that changes in and modifications of the construction herein described may be made without departing from the spirit of my invention or sacrificing its advantages.

My improved seat for bicycles and similar vehicles is perfectly adapted to accomplish the result for which it is intended and much superior to other devices of this class now in use.

Having fully described my invention, I claim as new and desire to secure by Letters Patent—

1. A seat or saddle for bicycles and similar vehicles, which is adapted to be connected with the vehicle in the usual manner, and which comprises a support, a plurality of hollow, elastic cushions or pads mounted on said support, and filled with air under normal pressure and hermetically sealed, and a seat proper which is mounted on and supported by said cushions or pads, said cushions or pads being plano-convex in form, and the flat surface of each being directed downwardly, and provided with a base-plate or support to which they are secured, substantially as shown and described.

2. A seat or saddle for bicycles and similar vehicles, which is adapted to be connected with the vehicle in the usual manner, and which comprises a support, a plurality of hollow, elastic cushions or pads mounted on said support, and filled with air under normal pressure and hermetically sealed, and a seat proper which is mounted on and supported by said cushions, or pads, said cushions or pads being plano-convex in form, and the flat surface of each being directed downwardly and provided with a base-plate or support to which they are secured, said pads being also composed of two parts one of which is placed within the other, and said seat being vertically movable and provided with cavities which receive the convex surface of said cushions or pads, substantially as shown and described.

3. A seat or saddle for bicycles and similar vehicles, comprising a triangular spring-support which is adapted to be secured to the frame of a vehicle in the usual manner, and to the upper side of which are secured a plurality of hollow elastic cushions or pads, filled with air under normal pressure and hermetically sealed, said cushions or pads being plano-convex in form, and the flat surface of each being directed downwardly and provided with a base-plate or support, said pads being also composed of two parts which are similar in form, and one of which is placed within the other, and a seat proper which is mounted on said cushions or pads and secured to said spring-support, said seat being vertically movable, substantially as shown and described.

4. A seat or saddle for bicycles and similar vehicles, comprising a triangular spring-support which is adapted to be secured to the frame of a vehicle in the usual manner, and to the upper side of which are secured a plurality of hollow elastic cushions or pads, filled with air under normal pressure and hermetically sealed, said cushions or pads being plano-convex in form, and the flat surface thereof being directed downwardly and provided with base-plates or supports, and a seat proper which is mounted on said cushions or pads and secured to said spring-support, said seat being vertically movable, and said cushions or pads being composed of a flexible bottom portion, and two hollow flexible portions, one of which is placed within the other, and each of which is hermetically sealed to the flexible bottom portion, substantially as shown and described.

5. A seat or saddle for bicycles and similar vehicles comprising a spring-support which is adapted to be secured to the frame of the vehicle, said support being provided with spring-arms to each of which is secured a plate to which is secured a plano-convex cushion or pad, and the flat portion of said pads being directed downwardly, and supported by said plates, each of said pads being filled with air under normal pressure and hermetically sealed, and the convex surfaces of said pads being directed upwardly, and a seat proper which is provided on its under surface with circular cavities which are adapted to receive the convex surfaces of the cushions or pads, substantially as shown and described.

6. A seat or saddle for bicycles and similar vehicles, the same consisting of a suitable spring-support, which is adapted to be secured to the frame of the vehicle, said spring-support being provided with spring-arms on which are mounted disks or plates to which are secured hollow, plano-convex cushions or pads, which are filled with air under normal pressure, and hermetically sealed, the convex surface of said cushions or pads being directed upwardly, and each being composed of an outer and an inner or reinforcing part, each of which is sealed or secured to a flexible bottom piece, and a seat proper which is provided with circular cavities on its under side which are adapted to receive the convex surfaces of said cushions or pads, said seat proper being mounted on said pads, and secured in place, substantially as shown and described.

7. The herein-described seat or saddle for bicycles and similar vehicles, the same consisting of a rod provided with a tripod-head, and a metal plate connected with said tripod-head as described, and provided with upwardly and outwardly directed spring-arms, said spring-arms being each provided with a cushion or pad which is mounted thereon, and filled with air under normal pressure and hermetically sealed, and the seat proper being mounted on said pads, and supported thereby, and said seat being also connected with said metal plate, and being vertically movable, substantially as shown and described.

In testimony that I claim the foregoing as my invention I have signed my name, in presence of the subscribing witnesses, this 15th day of May, 1896.

CASSIUS M. RICHMOND.

Witnesses:
ALBERT B. LEFLER,
LEON C. RICHMOND.